May 18, 1937.          J. M. KANE          2,080,423
MONITORING SYSTEM
Filed May 16, 1934          2 Sheets-Sheet 1

Inventor
JAMES M. KANE
By Harold Dodd.
Attorney

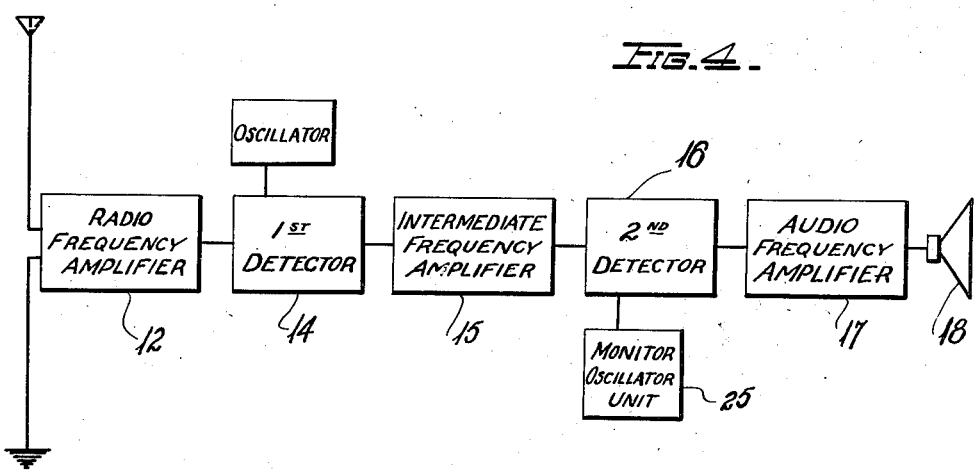
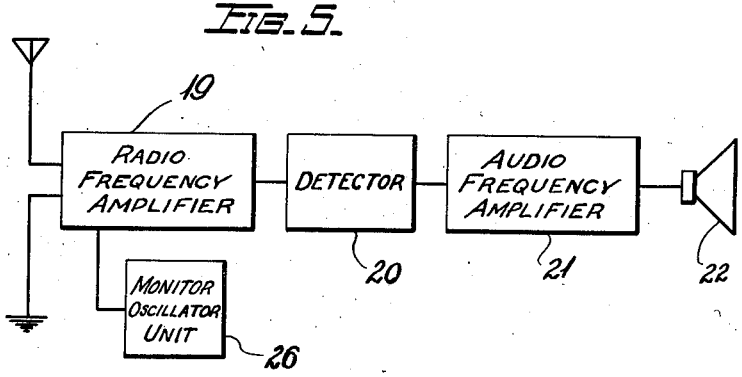
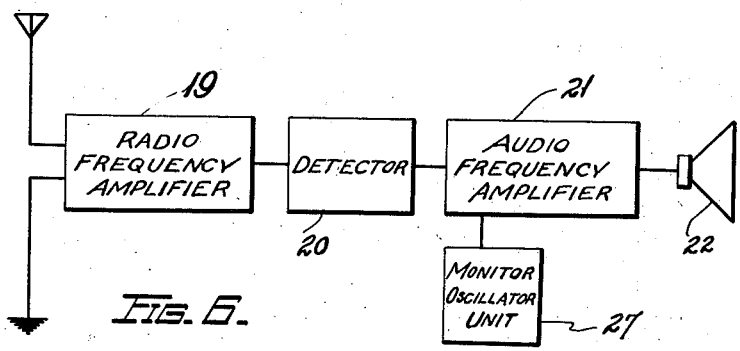

Patented May 18, 1937

2,080,423

UNITED STATES PATENT OFFICE 2,080,423

MONITORING SYSTEM

James M. Kane, Los Banos, P. I.

Application May 16, 1934, Serial No. 725,878

15 Claims. (Cl. 250—9)

(Granted under the act of March 3, 1883, as amended April 30, 1928; 370 O. G. 757)

My invention relates broadly to two-way radio communication systems and particularly to a means for monitoring the local transmitter of a two-way communication system.

One of the objects of my invention is the provision of a method for observing the character of the locally transmitted signals in the same manner as the said signals would be received at a distant receiving station in order to check the speed, quality and frequency stability of transmission.

Another object of my invention is to provide monitoring means integral with the ordinary receiver for checking the local transmitter of a two-way communication system when, as is usually the case, the local transmitter is operating on a frequency different from that of the answering transmitter.

Still another object of my invention is to provide a convenient means for monitoring the local transmitter of a two-way communication system without the necessity of employing a plurality of receivers and switching means for connection of the telephones alternately to each receiver.

A further object of my invention is to provide a circuit employing but one receiver adjacent the transmitter for the dual purpose of monitoring the signals radiated from the local transmitter while listening to incoming signals, simultaneously.

A still further object of my invention is to provide a circuit arrangement for effecting simultaneous reception without need of adjustment of the monitor even though the frequency of the transmitter be changed.

Another object of my invention is to provide a circuit arrangement for effecting simultaneous reception without need of adjustment of the monitor unless the frequency of the local transmitter be changed.

Still another object of my invention is to provide a circuit for monitoring the local transmitter for a two-way communication system in cooperation with standard types of receivers without change in the design of the standard receiver.

Figure 1:
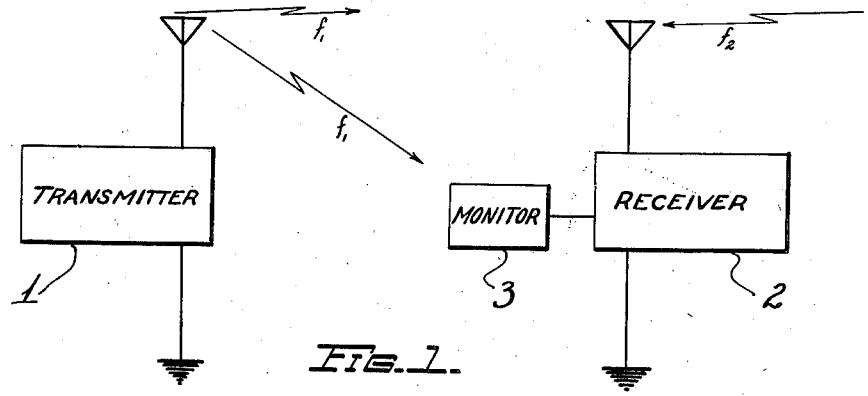
Figure 2:
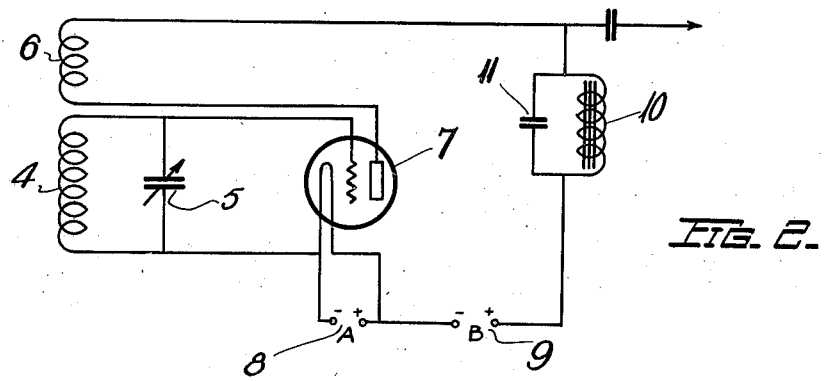
Figure 3:
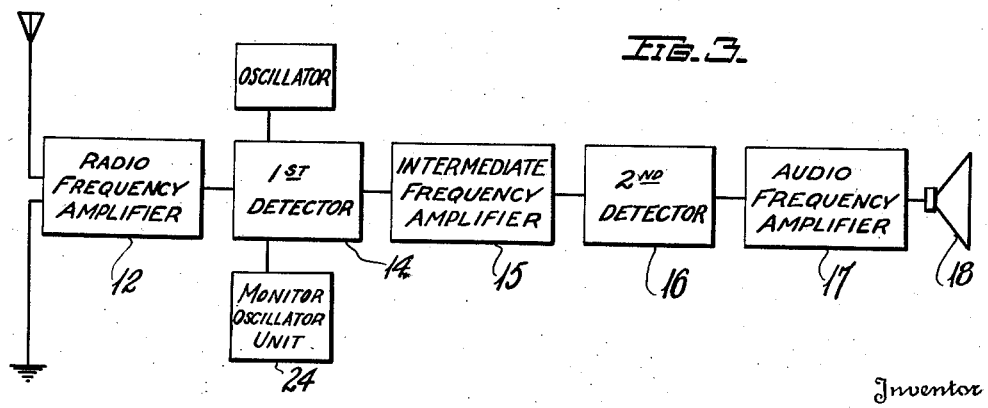

Other and further objects of my invention will be apparent from the following specification by reference to the accompanying drawings, in which:

Figure 1 is a diagrammatic sketch of the general location and arrangement of the monitoring system of my invention in a two-way communication system; Fig. 2 is a schematic diagram of the monitor oscillator circuit included in the monitoring system of my invention; Fig. 3 is a diagrammatic sketch indicating one method of association of the monitor oscillator unit with the superheterodyne type of receiver in the monitoring system of my invention; Fig. 4 is a diagrammatic sketch illustrating another method whereby the monitor oscillator unit may be associated with the superheterodyne type of receiver in the monitoring system of my invention; Fig. 5 is a diagrammatic sketch illustrating one method of associating the monitor oscillator unit with the tuned radio frequency type of receiver in the monitoring system of my invention; and Fig. 6 is a diagrammatic sketch illustrating another method of associating the montor oscillator unit with the tuned radio frequency type of receiver in the monitoring system of my invention.

Referring to Fig. 1 in detail, reference character 1 indicates the transmitter, 2 the receiver, and 3 the monitor oscillator unit, with arrows to indicate the path of radio frequency radiations. In Fig. 2, elements 4, 5, 6, 7, 8 and 9 comprise a simple oscillating circuit whose frequency is variable and controllable by the variable condenser at 5. This circuit can be installed in the same cabinet with a standard receiver and coupled therewith as described hereinafter. The audio frequency choke at 10 and the condenser at 11 need be employed only when the circuit is associated with a tuned radio frequency type of receiver where its output must be of audible frequency. This connection arrangement is shown at 27 in Fig. 6 where the monitor oscillator unit is connected beyond the detecting means of the receiver.

Fig. 3 illustrates the monitor oscillator unit in combination with a superheterodyne type of receiver. The monitor oscillator circuit may be coupled very loosely through a .00005 microfarad condenser to the first detector as indicated at 24. The output of the monitor oscillator circuit will then be conducted through the first detector at 14, intermediate frequency amplifiers at 15, the second detector 16 and audio frequency amplifiers 17 to the telephones at 18, at all times, regardless of the frequency to which the former portions of the receiver at 12 may be tuned. The monitor oscillator circuit in this case acts to heterodyne the locally transmitted signals as the regular oscillator of the receiver heterodynes the frequency to which the radio frequency amplifiers are tuned. The frequency of the monitor oscillator circuit, controlled by condenser 5, need not be changed so long as the beat frequency between the frequency of the local transmitter and the frequency of the monitor oscillator circuit, lies within the range covered by the intermediate frequency amplifiers. This results practically in a first adjustment and then the obtaining of monitoring benefits regardless of transmitter frequency within limits.

The monitor oscillator circuit may also be coupled to the second detector as shown at 25 in Fig. 4. The beat frequency of the monitor oscillator output in this case is irrelevant, the monitor circuit being merely the pickup of the energy to be impressed on the grid of the second detector.

Fig. 5 illustrates the monitor oscillator unit in combination with a tuned radio frequency type of receiver. The monitor oscillator circuit in this connection may be coupled to the grid of the first of the radio frequency amplifiers as shown at 26. If this is the case, then the beat frequency output of the monitor oscillator circuit must be equal to the frequency of the transmitter with which the receiver is made resonant in order that the tuned radio frequency stages at 19 will pass the signal. These radio frequency amplifiers then act as intermediate frequency amplifiers of a superheterodyne type of receiver. It will, of course, be necessary to tune the monitor oscillator circuit for every change in frequency of either the local or the distant transmitter, if this connection is employed. However, with proper calibration, this connection affords a precision check on the frequency of the local transmitter. A similar connection may also be employed in alliance with the superheterodyne type of receiver, if desired. As described above, and illustrated in Fig. 4, the monitor oscillator circuit can also be coupled to the detector 20 in the tuned radio frequency type of receiver. The frequency is irrelevant as described above, and no adjustment of the monitor oscillator circuit is required for changes in the frequency of the local transmitter.

The monitor oscillator circuit in connection with the tuned radio frequency type of receiver, may also be coupled to the grid of the first of the audio frequency amplifiers 21, shown at 27 in Fig. 6. If such is the case, the beat frequency output of the monitor oscillator must be of audible magnitude in order that the audio frequency stages will pass the signal. Since the audible frequency range is small in comparison with radio frequency magnitudes it will be necessary to vary the frequency of the monitor oscillator with any appreciable change in frequency of the local transmitter. A similar connection may also be employed in alliance with the superheterodyne type of receiver if desired. As stated in the description of Fig. 2 above, the audio frequency choke 10 and condenser 11 are necessary in the monitor oscillator circuit when an audible beat is required. The monitoring system of my invention is adapted for use in transmitting and receiving stations where the same operator attends both systems, as for instance, in amateur, military and commercial communication stations, ship installations and portable outfits, the local receiving system will always be comparatively adjacent the local transmitter. Thus, some of the energy radiated by the local transmitter will be normally picked-up by the monitor oscillator circuit. Should the monitor circuit be exceptionally well shielded, a short length of conductor connected to the grid circuit of the oscillator tube may be loosely coupled to the local transmitter. In Fig. 2 I show the monitor circuit unshielded and in this condition, when disposed as shown in Fig. 1, with respect to the antenna connected to the local transmitter, will pick up a certain amount of the energy radiated therefrom.

In installations such as that shown in Fig. 1, where separate antennae are provided for transmitter and receiver, the same frequency is not used by each transmitter in the two-way system since the local receivers would then be resonant to the local transmitters. In such an arrangement, the monitor system of my invention is particularly efficient, in that it picks up only a sufficient amount of the locally radiated energy, and adapts the frequency thereof to the resonant frequency of the receiving circuit. In this way the operator may be constantly listening for response to his signals, or noting the operation of his own transmitter.

In the case of a single antenna installation the monitor circuit of my invention will function in the same manner since it is provided with its own pickup circuit independent of the receiving system.

My invention possesses marked advantages over the practices of the prior art by eliminating duplicity in the circuit of the monitor and the standard receiver and increasing simplicity in operation with considerable reduction in installation cost.

While I have described my invention in certain of its preferred embodiments I desire it to be understood that modifications may be made and that no limitations upon my invention are intended except as may be imposed by the scope of the appended claims.

The invention herein described may be manufactured and used by or for the Government of the United States of America for governmental purposes without the payment of any royalty thereon or therefor.

What I claim as new and desire to secure by Letters Patent of the United States is as follows:

1. In a two-way radio communication system including a local modulated transmitter, a monitoring system for observing the operation of the local modulated transmitter of said two-way communication system, said monitoring system comprising in combination with a standard radio receiving circuit adapted for general reception of radio frequency signal energy, means for delivering to said radio receiving circuit signal energy from the local transmitter of said two-way communication system, said radio receiving circuit and said means being separately and individually adjustable to changes in the frequency of the respective signal energy received.

2. A monitoring system as in claim 1 wherein the means for delivering to said radio receiving circuit signal energy from the local transmitter is connected to said radio receiving circuit beyond the tuning means thereof.

3. A monitoring system as in claim 2 wherein the means for delivering to said radio receiving circuit signal energy from the local transmitter is connected to said radio receiving circuit beyond the detecting means thereof.

4. In a two-way radio communication system, a monitoring system comprising in combination a local modulated transmitter, an oscillator circuit and a standard radio receiving circuit, the input of said oscillator circuit being coupled with the output of the local transmitter, and means for combining the output of said oscillator circuit with said radio receiving circuit for conducting signal intelligence from said oscillator circuit to the output of said radio receiving circuit without interfering with the ordinary reception function of said receiving circuit, and while observing the operation of said local transmitter.

5. A monitoring system as in claim 1 wherein said standard radio receiving circuit comprises a superheterodyne circuit, and said means for delivering to said radio receiving circuit signal energy from the local transmitter is connected to the first detector of said superheterodyne circuit.

6. A monitoring system as in claim 1 wherein said standard radio receiving circuit comprises a superheterodyne circuit, and said means for delivering to said radio receiving circuit signal energy from the local transmitter is connected to the second detector of said superheterodyne circuit.

7. In a two-way radio communication system, a monitoring system comprising in combination with a local modulated transmitter of said two-way communication system, an oscillator circuit and a tuned radio frequency radio receiving circuit, the input of said oscillator circuit being coupled with the output of said local transmitter, means for combining the output of said oscillator circuit with said radio receiving circuit at the input thereof for conducting signal intelligence from said oscillator circuit to the output of said radio receiving circuit without interfering with the ordinary reception function of said receiving circuit.

8. In a two-way radio communication system, a monitoring system comprising in combination with a local modulated transmitter of said two-way communication system, an oscillator circuit and a superheterodyne radio receiving circuit, said oscillator circuit coupled with said transmitter and receiving signal energy therefrom, means for combining the output of said oscillator circuit with said radio receiving circuit beyond the tuning means thereof for conducting signal intelligence from said oscillator circuit to the output of said radio receiving circuit for observing the condition of operation of said local transmitter without interfering with the ordinary reception function of said receiving circuit and independent of the frequency of normally received radio frequency signal energy.

9. In a two-way radio communication system, a monitoring system comprising in combination with a local modulated transmitter, an oscillator circuit and a tuned radio frequency radio receiving circuit, said oscillator circuit coupled with said transmitter and receiving signal energy therefrom, means for combining the output of said oscillator circuit with said radio receiving circuit beyond the tuning means thereof for conducting signal intelligence from said oscillator circuit to the output of said radio receiving circuit for observing the condition of operation of said local transmitter without interfering with the ordinary reception function of said receiving circuit and independent of the frequency of normally received radio frequency signal energy.

10. In a two-way radio communication system, a monitoring system comprising in combination with a local modulated transmitter, an oscillator circuit and a tuned radio frequency radio receiving circuit, the input of said oscillator circuit coupled with the output of said local transmitter, means for combining the output of said oscillator circuit with said radio receiving circuit beyond detecting means thereof for conducting signal intelligence from said oscillator circuit to the output of said radio receiving circuit for observing the condition of operation of said local transmitter without interfering with the ordinary reception function of said receiving circuit and independent of the frequency of normally received radio frequency signal energy.

11. In a two-way radio communication system, a monitoring system comprising in combination with a local modulated transmitter of said two-way communication system, a standard radio receiving set and an oscillator circuit, the input of said oscillator circuit coupled through space with the output of said local modulated transmitter, means for combining the output of said oscillator circuit with said radio receiving set, for conducting signal intelligence from said oscillator circuit to the output of said radio receiving circuit for observing the condition of operation of said local transmitter without interfering with the ordinary reception function of said receiving circuit, and independent of the frequency of normally received radio frequency signal energy.

12. In a two-way radio communication system, a monitoring system comprising in combination with a local modulated transmitter of said two-way communication system, a standard radio receiving set and an oscillator circuit, the input of said oscillator circuit electrically coupled with the output of said local modulated transmitter, means for combining the output of said oscillator circuit with said radio receiving set for conducting signal intelligence from said oscillator circuit to the output of said radio receiving circuit for observing the condition of operation of said local transmitter without interfering with the ordinary reception function of said receiving circuit, and independent of the frequency of normally received radio frequency signal energy.

13. In a two-way radio communication system, a monitoring system comprising in combination with a local modulated transmitter of said two-way communication system, a standard radio receiving set and an oscillator circuit, the input of said oscillator circuit electromagnetically coupled with the output of said local modulated transmitter, means for combining the output of said oscillator circuit with said radio receiving set for conducting signal intelligence from said oscillator circuit to the output of said radio receiving circuit for observing the condition of operation of said local transmitter without interfering with the ordinary reception function of said receiving circuit, and independent of the frequency of normally received radio frequency signal energy.

14. In a two-way radio communication system including a local modulated transmitter, a signal receiving system comprising a signal receiving circuit and a monitor circuit, said monitor circuit comprising means for impressing signal energy from the local modulated transmitter of said two-way communication system upon said receiving circuit at a frequency different from the frequency of said signal energy for observing the condition of operation of said local transmitter.

15. In a two-way radio communication system, a signal receiving circuit, means for transmitting energy locally with respect to said receiving circuit, and a monitor system, said monitor system comprising an oscillator circuit and a portion of said signal receiving circuit, said monitor system being adapted to receive locally transmitted energy and render such energy effective upon said receiving circuit independent of the normal reception of signaling energy by said signal receiving circuit for observing the transmission characteristics of said locally transmitted energy.

JAMES M. KANE.